United States Patent Office 3,642,665
Patented Feb. 15, 1972

3,642,665
PROCESS FOR THE PRODUCTION OF POLY-
ETHERS OF HIGH MOLECULAR WEIGHT
Robert Gehm, Limburgerhof, Germany, and Ernst-
Guenther Kastning, deceased, late of Assenheim, Germany, by Marie-Louise Hermine Kastning, heiress-at-law and legal representative of minor heirs, Assenheim, and Kurt Schneider, Limburgerhof, Germany, assignors to Badische Anilin- & Soda-Fabrik Aktiengesellschaft, Ludwigshafen, Germany
No Drawing. Filed Aug. 12, 1969, Ser. No. 849,529
Claims priority, application Austria, Aug. 12, 1968,
A 7,877/68
Int. Cl. C08g 23/06, 23/14
U.S. Cl. 260—2                                 4 Claims

ABSTRACT OF THE DISCLOSURE

A process for the production of high-molecular-weight polymers of 1,2-alkylene oxides using a catalyst prepared by reacting 1 mole of an alkaline earth metal hexaammoniate and/or an alkaline earth metal amide in liquid ammonia with 0.1 to 1 mole of a 1,2-alkylene oxide and 0.1 to 2 moles of guanidine and/or a guanidine salt and/or a mixture of substances which will form a guanidine salt under the reaction conditions.

---

This invention relates to a process for the production of polymers of 1,2-alkylene oxides having a high molecular weight.

It is known from British patent specification No. 869,116 that epoxides can be polymerized by means of catalysts which consist solely of nitrogen, hydrogen and a metal of Group 11 of the Periodic System having an atomic number from 19 to 57, for example calcium amide. Higher rates of polymerization are achieved however by using, in accordance with the teaching of British patent specification No. 801,031 and U.S. patent specification No. 3,231,515, having the formula:

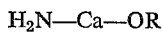

$$H_2N-Ca-OR$$

in which R denotes an alkyl or aryl radical, which are formed for example in the reaction of calcium amide or calcium hexaammoniate with an epoxide.

It is known that catalysts of alkaline earth metal hexaammoniate, olefin oxide and a nitrile of an organic carboxylic acid may be used to regulate molecular weight. These catalysts are very sensitive to carbon dioxide and moisture however so that these impurities have to be carefully eliminated.

We have now found that polyethers having a high molecular weight can be prepared in good yields by polymerization of 1,2-alkylene oxides in the presence of 0.05 to 10% by weight (with reference to the amount of 1,2-alkylene oxide) of a catalyst based on an alkaline earth metal compound by using a catalyst which has been prepared in liquid ammonia by the reaction of 1 mole of an alkaline earth metal hexaammoniate and/or an alkaline earth metal amide with 0.1 to 1 mole of a 1,2-alkylene oxide and 0.1 to 2 moles of guanidine and/or a guanidine salt and/or a mixture of substances which form a guanidine salt under the reaction conditions.

This result is surprising because the catalyst can be prepared even with an addition of the "impurities" carbon dioxide and water which have a detrimental effect on other catalysts for the polymerization of alkylene oxides.

The catalysts used according to this invention have the advantage over prior art catalysts for the polymerization of alkylene oxides that when an equal amount of alkaline earth metal (with reference to alkylene oxide) is used higher conversion of alkylene oxide to polymers having higher molecular weights and exhibiting a more favorable sedimentation effect in turbid coal washing liquors is obtained in the same period of time.

The catalysts used according to the invention may be prepared by reaction of, or interaction between, an alkaline earth metal haxaammoniate having the formula $M(NH_3)_6$ (in which M denotes an alkaline earth metal) and/or an alkaline earth metal amide, a 1,2-alkylene oxide or a mixture of alkylene oxides and guanidine and/or a guanidine salt. The appropriate strontium, barium and particularly calcium compounds are very suitable as the alkaline earth metal compounds. The salts of guanidine with a lower carboxylic acid and also the sulfate and especially the carbonate are very suitable. Mixtures of substances which form a guanidine salt under the reaction conditions may also be used instead of or in addition to the guanidine salts.

The reaction is carried out in liquid ammonia and advantageously at from $-78°$ C. to $+133°$ C., preferably at from $-78°$ C. to room temperature, if necessary in an autoclave. The excess ammonia is evaporated off from the reaction product.

1,2-alkylene oxides having from two to eight carbon atoms are suitable as alkylene oxides for the process according to the invention for the production of the catalyst and for polymerization; of these, propylene oxide-1,2, butylene oxide-1,2, butadiene monoxide-1,2, 1-phenylethylene oxide-1,2 and particularly ethylene oxide and mixtures of these epoxides or alkylene oxides are particularly suitable. Different 1,2-alkylene oxides may be used successively in the polymerization so that block copolymers are formed.

Polymerization is advantageously carried out in the presence of an inert organic solvent or diluent. In the preferred embodiment of the process, the polymerization is carried out in the presence of an inert organic diluent in which the monomers are soluble but the resultant polymer is insoluble. Liquid saturated hydrocarbons and particularly aliphatic hydrocarbons having from about five to ten carbon atoms have proved to be suitable. If the polymerization temperature is kept below the softening point of the resultant polymer (this being the preferred method) the polymer is obtained in fine granules. Generally polymerization at atmospheric pressure while stirring the polymerization mixture is advantageous but it is also possible to use slightly superatmospheric pressure in a closed vessel. The monomer or monomer mixture may be added all at once to the catalyst and solvent or precipitant and thus reacted or may be fed in portions into the reaction mixture. It is also possible, by varying the monomers added during the reaction, to prepare not only homopolymers but also statistical copolymers and block copolymers, for example from ethylene oxide and propylene oxide.

The amount of catalyst is from 0.05 to 10%, advantageously from 0.2 to 10%, particularly from 0.2 to 5%, by weight with reference to the amount of monomers; it is favorable to use a high concentration of catalyst if it is desired to achieve a high yield of polymer at a low polymerization temperature. Polymerization is generally effected at temperatures of from $-30°$ C. to $+150°$ C., preferably below the softening point of the resultant polymer, and particularly at temperatures of from about $-10°$ C. to $+60°$ C. The lower polymerization temperatures are advantageously maintained by external cooling of the polymerization mixture or by evaporative cooling of the inert diluents.

In the polymerization of ethylene oxide by the process according to the invention, polymers with particularly good properties are obtained by beginning the polymerization at about $-30°$ C. and then gradually raising the temperature to about $+35°$ C. The rise in temperature may be appropriately controlled by withdrawing the heat of reaction by means of evaporative cooling and/or external cooling.

Even when the catalyst remains in the alkylene oxide polymers obtainable by the process according to the invention, the properties of the resultant products are very good. Thus polyethylene oxides prepared according to the invention and still containing catalyst are highly effective flocculants which are particularly valuable as assistants for accelerating sedimentation of the solids suspended in aqueous coal washing liquors. In this application, the polymers of ethylene oxide obtainable according to the present invention are clearly more effective than polymers which have been prepared using catalysts of ammonia, calcium, alkylene oxide with or without an organic nitrile.

The parts and percentages given in the following examples and comparative examples are by weight unless stated otherwise. Parts by volume bear the same relation to parts by weight as the liter to the kilogram. The reduced viscosities ($\eta_{red}$) given are determined in the Ubbelohde viscosimeter with a 0.1% by weight aqueous solution of the polymer. The reduced viscosity ($\eta_{red}$), which is a measure of the molecular weight of the polymers, is obtained from the specific viscosity ($\eta_{sp}$) by dividing it by the concentration (in g./ml.) (cf. Houben-Weyl, "Methoden der Organischen Chemie," 4th edition, Stuttgart, 1963, volume XIV/1, page 81).

EXAMPLES 1 TO 5

Production of catalyst A 24.1 parts (0.134 mole) of guanidine carbonate is suspended in 1000 parts by volume of liquid ammonia ($-60°$ C.) and then 20 parts of calcium chips are brought into solution while stirring. Then 11 parts (0.25 mole) of ethylene oxide is added and the blue reaction mixture has 250 parts of dry n-heptane added to it.

The whole is allowed to stand for a period of eighteen hours during which the major portion of the ammonia evaporates. Some of the organic solvent (about 100 parts) is then distilled off to remove residual ammonia at about 90° to 100° C. and, after cooling, the reaction mixture is made up to 400 parts by volume with dry heptane.

The catalyst is obtained in the form of a suspension in heptane; it settles at the bottom of the reservoir as a grey substance.

100 parts of the well homogenized suspension thus contains 5 parts of calcium.

Production of catalyst B

The above procedure is followed but 90 parts (0.5 mole) of guanidine carbonate is used.

Production of catalyst C

The above procedure is followed but 108 parts (0.6 mole) of guanidine carbonate is used.

Production of catalyst V1 (comparative catalyst)

The above procedure is followed but 5.5 parts (0.134 mole) of acetonitrile is used instead of guanidine carbonate.

Production of catalyst V2 (comparative catalyst)

The procedure for the production of catalyst A is followed but the use of guanidine carbonate is dispensed with.

Polymerization is carried out as follows:

In each of five stirred vessels provided with a carbon dioxide condenser, thermometer and means for supplying nitrogen, 112 parts of n-heptane which has been dried over sodium and 10 parts by volume of the well homogenized suspension of catalyst A, B, C, V1 or V2 are placed and cooled with an ice bath to 0° C. while stirring. In each case 50 parts of liquid ethylene oxide at $-20°$ C. is added to the suspension. After the cooling bath has been removed, the reaction mixture is allowed to stand.

The temperature rises to $+19°$ C. to $+35°$ C. in the course of two to three hours (cf. table) and then falls to room temperature again after a total of six to seven hours.

A thick white slurry of suspended polyethylene oxide forms in the flask. This is freed from precpitant by suction and then dried at room temperature in vacuo.

The results are given in the table, in which the following abbreviations are used:

Ex=Example No. (comparative experiments=C)
Cat=catalyst
T=time in hours
Temp=temperature reached in ° C.
YP=yield of polymer in parts
Y%=yield of polymer in percent
Visc=viscosity of the polymer, $\eta_{red}$ g./100 ml. water

| Ex | Cat | T | Temp | YP | Y% | Visc |
|---|---|---|---|---|---|---|
| 1 | A | 7 | 35 | 46 | 98 | 20.1 |
| 2 | B | 6 | 30 | 50 | 100 | 15.3 |
| 3 | C | 6 | 30 | 41 | 82 | 16.1 |
| 4C | V1 | 6 | 19 | 22 | 44 | 11 |
| 5C | V2 | 6 | 19 | 16 | 32 | 12.6 |

EXAMPLE 6

A catalyst is prepared from 20 parts of calcium, 30 parts of guanidine carbonate and 18.7 parts of propylene oxide as described for catalyst A.

10 parts by volume of the homogenized catalyst suspension in 112 parts of n-heptane has 50 parts of ethylene oxide added to it as described above. The temperature in the reactor rises in fifteen minutes to $+40°$ C.; the reactor is cooled with an external ice bath while stirring.

After a total of four hours the whole is worked up as described above. 50 parts of polyethylene oxide is obtained in the form of a white water-soluble powder having a reduced viscosity $\eta_{red}$ of 16.8.

EXAMPLE 7

This is a comparative example.

The procedure of Example 6 is followed but no guanidine carbonate is used in the preparation of the catalyst. After polymerization for six hours, 44 parts of a product having a reduced viscosity $\eta_{red}=4.8$ is obtained.

EXAMPLE 8

30 parts of a suspension of catalyst B of Example 1 is introduced with 336 parts by volume of n-heptane into a stirred autoclave having a capacity of 2000 parts by volume. The autoclave is closed and the air is expelled with nitrogen. After heating up to 100° C., 50 parts of ethylene oxide and 50 parts of propylene oxide are forced in successively. The pressure is about 6 atmospheres gauge. 86 parts of a solid, somewhat sticky material is isolated which dissolves in water to give a turbid solution. The reduced viscosity of the polymer is $\eta_{red}=2.24$.

We claim:

1. A process for the production of polyethers which comprises polymerizing a 1,2-alkylene oxide in the presence of 0.05 to 10% by weight (with reference to the amount of 1,2-alkylene oxide) of a catalyst which has been prepared by reaction in liquid ammonia of:
   (a) 1 mole of a calcium compound selected from the group consisting of the ammoniate, the amide and mixtures thereof, said calcium compound being obtained by dissolving calcium in liquid ammonia,
   with
   (b) 0.1 to 1 mole of said 1,2-alkylene oxide and
   (c) 0.1 to 2 moles of guanidine carbonate.

2. A process as claimed in claim 1 wherein polymerization is carried out in an inert liquid organic diluent in which the 1,2-alkylene oxide is soluble and the resultant polymer is insoluble.

3. A process as claimed in claim 1 wherein a plurality of 1,2-alkylene oxides are reacted in succession.

4. A process as claimed in claim 1 wherein the 1,2-alkylene oxide is a compound selected from the group consisting of ethylene oxide, propylene oxide, and mixtures thereof.

References Cited

UNITED STATES PATENTS

| | | | |
|---|---|---|---|
| 2,969,402 | 1/1961 | Hill et al. | 260—632 |
| 3,037,943 | 6/1962 | Hill et al. | 260—2 |
| 3,127,358 | 3/1964 | Hill | 260—2 |
| 3,214,387 | 10/1965 | Hill et al. | 252—431 |

WILLIAM H. SHORT, Primary Examiner

E. A. NIELSEN, Assistant Examiner

U.S. Cl. X.R.

252—431 N; 260—615 B

PO-1050
(5/69)

UNITED STATES PATENT OFFICE
CERTIFICATE OF CORRECTION

Patent No. 3,642,665          Dated February 15, 1972

Inventor(s) Robert Gehm, Ernst-Guenther Kastning, and Kurt Schneider

It is certified that error appears in the above-identified patent and that said Letters Patent are hereby corrected as shown below:

Column 4, line 52, "ethylene oxide" should read -- ethylene oxide, 50 parts of propylene oxide, 50 parts of ethylene oxide --.

Signed and sealed this 5th day of September 1972.

(SEAL)
Attest:

EDWARD M. FLETCHER, JR.                ROBERT GOTTSCHALK
Attesting Officer                      Commissioner of Patents